May 4, 1926.
A. P. BRUSH
BRAKE OPERATING MECHANISM
Filed Sept. 30, 1925
1,583,121
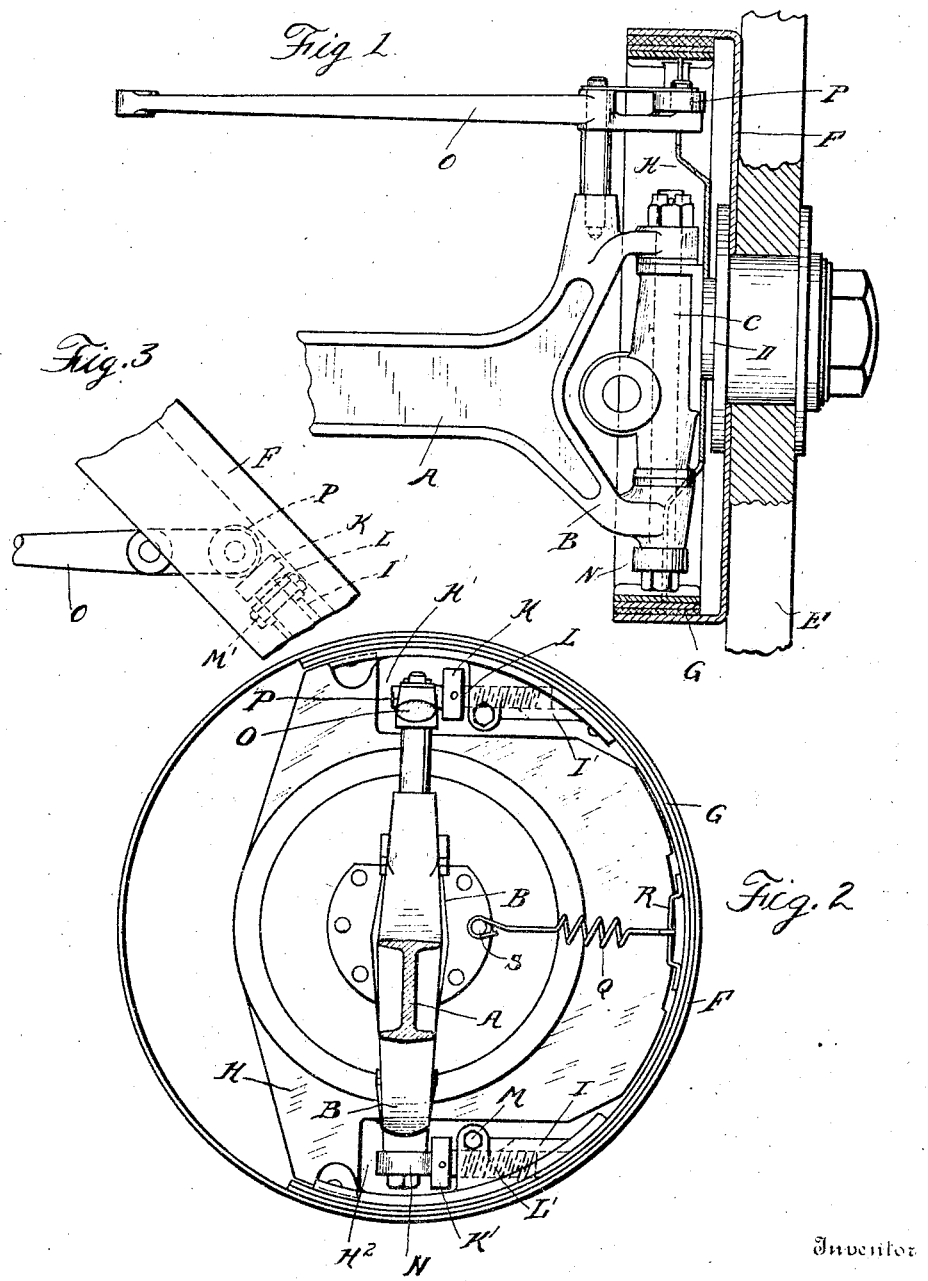
Inventor
ALANSON P. BRUSH Patented May 4, 1926.

1,583,121

UNITED STATES PATENT OFFICE.

ALANSON P. BRUSH, OF DETROIT, MICHIGAN.

BRAKE-OPERATING MECHANISM.

Application filed September 30, 1925. Serial No. 59,490.

*To all whom it may concern:*

Be it known that I, ALANSON P. BRUSH, a citizen of the United States, residing in Detroit, in the county of Wayne and State of Michigan, have invented a certain new and useful Improvement in Brake-Operating Mechanism, of which the following is a specification.

This invention relates to brakes for use upon vehicle wheels swivelled upon their axles, as, for instance, the usual front wheel of a motor vehicle. It is the object of the invention to obtain a novel and very simple construction of operating mechanism which will not interfere with the free turning or pivoting of the wheel.

One feature of the invention relates to arranging a novel brake operating member, shown as a lever fulcrumed on the axle, so that the brake-applying part moves from an idle position spaced from the swivelling axis of the wheel to an active position substantially in that axis. Preferably the lever is fulcrumed between its ends, and swings in a generally horizontal plane, so that its inner end may be connected directly to the brake rod or the like, thus eliminating all of the direction-changing transmission necessary in prior arrangements in which the joint at the end of the lever is at all times in the swivelling axis. This also permits a considerable multiplication of power by means of the lever.

Other features of the invention relate to an improved brake band support, and to other novel combinations of parts and desirable particular constructions which will be apparent from the following description of the embodiment shown in the accompanying drawings, in which:

Figure 1 is a front elevation of the axle and brake mechanism, the latter being partly in section;

Figure 2 is an elevation at right angles to Figure 1;

Figure 3 is a partial plan view showing the brake drum in angular relation to the operating lever.

A is the stationary axle such as commonly used for the front axle of a motor vehicle and which is provided with the bifurcated end B forming bearings for the pivot C of the axle spindle D on which the wheel E is mounted. F is a brake drum mounted upon the wheel E which surrounds the furcations B and pivots C, and G is a brake shoe arranged within said brake drum.

H is a member, preferably formed of pressed sheet metal, which has a portion surrounding the axle spindle and which extends radially outward and then laterally inward into the central plane of the brake shoe, its peripheral portion forming a rest for said shoe. The member H is cut away at H' and H² to provide clearance for bracket members I and I' which are secured to the inner face of the shoe adjacent to opposite ends thereof. K and K' are abutments which are adjustably secured in the brackets I and I', preferably by being provided with threaded shanks L and L' engaging correspondingly threaded split sockets in said brackets, said sockets being clamped upon the threaded shanks by screws M. N is an abutment member which is secured to the stationary axle in alignment with the axis of the pivot C, being preferably a roller bearing secured to one of the furcations B.

In order to avoid the complications of conventional operating devices for front brakes, and according to an important feature of the invention, the brake is applied by a horizontally-swinging lever O, directly connected at its left end (Fig. 1) to a brake rod or other means operated by the pedal or its equivalent. The lever O is fulcrumed near its right end on the axle A, so that there is a considerable multiplication of power as the right end, carrying an anti-friction roller P, is swung, in applying the brake, from an idle position spaced rearwardly of the swivelling axis of the wheel forwardly to an active position in which it is substantially in that axis. Since the lever extends along the axle away from the wheel, it carries the brake-applying connections a considerable distance inwardly from the wheel, substantially opposite the chassis frame, so that there is no possibility that those connections will interfere with steering movement of the wheel. In describing the lever, the term "inwardly" is intended to define the direction away from the wheel and toward the chassis frame, and the term "outwardly" to define the direction toward the wheel.

That is, when the brake is applied, the axis of roller P is substantially coincident with the swivelling axis of the wheel, so that the brake does not interfere with swivelling the wheel, nor does swivelling the wheel change the pressure on the brake. Abutment K is adjusted from time to time to preserve this relationship as the brake lining wears.

In operation, the brake is set by a movement of the lever O which forces the brake shoe against the inner face of the brake drum, while at the same time the wheel is free to turn upon the pivot C without interference from the brake mechanism. This is for the reason that both the abutment N and the bearing P are in substantial alignment with the axis of the pivot, so that there will be no relative displacement by the turning of the wheel around said pivot. On the other hand, all of the braking stress is transmitted directly into the stationary axle without any strain upon the pivot of the spindle. The anchor for the brake band is claimed in my prior Patent No. 1,470,803.

I claim:

1. The combination with a swivelled wheel having a brake, of operating mechanism not swivelling with the wheel and including a brake-applying portion movable in a plane perpendicular to the swiveling axis of the wheel from an idle position spaced materially from the swivelling axis to an active position substantially in that axis.

2. The combination with a swivelled wheel having a brake, of operating mechanism not swivelling with the wheel and including a brake-applying portion movable approximately parallel to the wheel and in a plane perpendicular to the swiveling axis of the wheel from an idle position spaced materially from the swivelling axis to an active position substantially in that axis.

3. The combination with a swivelled wheel having a brake, of operating mechanism including a lever having its brake-engaging portion movable in a plane perpendicular to the swiveling axis in applying the brake from an idle position spaced from the swivelling axis to an active position substantially in that axis.

4. The combination with a swivelled wheel having a brake, of operating mechanism including a lever having its brake-engaging portion movable in a plane perpendicular to the swivelling axis in applying the brake from an idle position spaced behind the swivelling axis forwardly to an active position substantially in that axis.

5. The combination with a swivelled wheel having a brake, of operating mechanism for the brake including a lever fulcrumed between its ends on the opposite side of the swivelling axis from the wheel, with its outer end movable in an arc substantially intersecting the swivelling axis and with its inner end spaced inwardly from the swivelling axis in a direction generally perpendicular to the wheel by a distance approximately equal to the length of the lever.

6. The combination with a swivelled wheel having a brake, of operating mechanism for the brake including a lever fulcrumed between its ends on the opposite side of the swivelling axis from the wheel for movement about an axis generally parallel to the swivelling axis but spaced inwardly therefrom, with its outer end movable in an arc substantially intersecting the swivelling axis with its inner end spaced inwardly from the swivelling axis in a direction generally perpendicular to the wheel by a distance approximately equal to the length of the lever.

7. The combination with an axle and a wheel swivelled thereto and having a brake, of operating mechanism for the brake including a lever fulcrumed intermediate its ends on the axle for generally horizontal swinging movement, and so arranged that its brake-applying portion is moved in applying the brake from a position spaced from the swivelling axis to an active position substantially in that axis.

8. The combination with a swivelled wheel having a brake, of operating mechanism for the brake including a lever fulcrumed intermediate its ends for generally horizontal swinging movement, and so arranged that its brake-applying portion is moved in applying the brake from a position spaced from the swivelling axis to an active position substantially in that axis.

9. The combination with a swivelled wheel having a brake, of operating mechanism for the brake including a thrust member swivelling with the wheel, and non-swivelling means engaging said member and movable in a plane perpendicular to the swiveling axis in applying the brake from an idle position spaced materially from the swivelling axis to an active position substantially in that axis.

10. The combination with a swivelled wheel having a brake, of operating mechanism for the brake including a thrust member swivelling with the wheel, and non-swivelling means engaging said member and movable in applying the brake from an idle position spaced from the swivelling axis to an active position substantialy in that axis, the thrust member being adjustable to preserve the relationship between the active position of said means and the swivelling axis as the brake lining wears away.

11. The combination with a swivelled wheel having a brake, of operating mechanism for the brake including a thrust member swivelling with the wheel, and a generally horizontal lever having a part engaging said member and movable in applying the brake from an idle position spaced from the swivelling axis to an active position substantialy in that axis.

12. The combination, with an axle and a wheel having a brake swivelled at the end of the axle, of brake-applying mechanism including a lever fulcrumed between its ends on the opposite side of the swivelling axis from the wheel, and with its outer end swinging in an arc substantially intersecting the swivelling axis, and which extends inwardly along the axle from the swivelling axis.

13. The combination with a swivelled wheel having a brake drum, of a friction device anchoring at one end within the drum, and a brake-operating lever directly transmitting thrust to the unanchored end of said device to expand the device against the drum, the brake-applying end of the lever being movable substantially perpendicular to the swivelling axis of the wheel.

14. The combination with a swivelled wheel having a brake drum, of a friction device anchoring at one end, and a brake-applying lever movable in a plane substantially perpendicular to the swivelling axis and directly transmitting thrust to the unanchored end of said device to force it against the drum, the brake-applying end of the lever being arranged when the brake is applied substantially in the swivelling axis.

15. The combination with a substantially vertical wheel having a brake drum, of a friction device anchoring at one end within the drum, and a substantially horizontal brake-applying lever fulcrumed between its ends and having one end extending into the brake drum and directly transmitting thrust to the unanchored end of said device to expand said device against the drum.

16. The combination, with an axle and a wheel having a brake swivelled at the end of the axle, of brake-applying mechanism including a lever fulcrumed between its ends on the axle on the opposite side of the swivelling axis from the wheel, with its outer end swinging in an arc substantially intersecting the swivelling axis, and extending above and generally parallel to the axle inwardly from the swivelling axis and from the wheel.

17. The combination, with an axle and a wheel having a brake swivelled at the end of the axle, of brake-applying mechanism including a lever fulcrumed on the opposite side of the swivelling axis from the wheel, with its outer end swinging in an arc substantially intersecting the swivelling axis, and extending above and generally parallel to the axle inwardly from the swivelling axis and from the wheel.

18. The combination, with a swivelled wheel having a brake including a brake-applying thrust member, of a lever fulcrumed on the opposite side of the swivelling axis from the wheel and extending inwardly from the swivelling axis generally perpendicular to the plane of the wheel for substantially the length of the lever and having at its outer end a part engaging said thrust member, the thrust member being movable on said part, when the wheel is swivelled with the brake applied, about a center substantially in the swivelling axis.

19. The combination, with a swivelled wheel having a brake including a brake-applying thrust member, of a lever extending inwardly from the swivelling axis generally perpendicular to the plane of the wheel for substantially the length of the lever and having at its outer end a part engaging said thrust member, the thrust member being movable on said part, when the wheel is swivelled with the brake applied, about a center substantially in the swivelling axis.

20. The combination, with a swivelled wheel having a brake including a brake-applying thrust part of a lever extending generally perpendicular to the wheel and having at its end a part disconnected from but engaging said thrust part, the engaging surface of one of said parts being curved in an arc whose center is substantially in the swivelling axis when the brake is applied.

21. The combination, with a swivelled wheel having a brake including a brake-applying thrust part of a lever extending generally perpendicular to the wheel and having at its end a part disconnected from but engaging said thrust part and curved in an arc whose center is substantially in the swivelling axis when the brake is applied.

In testimony whereof, I have hereunto signed my name.

ALANSON P. BRUSH.